US012641492B2

(12) United States Patent
Bergström et al.

(10) Patent No.: US 12,641,492 B2
(45) Date of Patent: May 26, 2026

---

(54) UE GROUP BASED CELL RESELECTION

(71) Applicant: Telefonaktiebolaget LM Ericsson (publ), Stockholm (SE)

(72) Inventors: Mattias Bergström, Sollentuna (SE); Pradeepa Ramachandra, Linköping (SE); Riikka Susitaival, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 670 days.

(21) Appl. No.: 17/776,385

(22) PCT Filed: Nov. 12, 2020

(86) PCT No.: PCT/IB2020/060660
§ 371 (c)(1),
(2) Date: May 12, 2022

(87) PCT Pub. No.: WO2021/094975
PCT Pub. Date: May 20, 2021

(65) Prior Publication Data
US 2022/0400414 A1    Dec. 15, 2022

Related U.S. Application Data

(60) Provisional application No. 62/934,837, filed on Nov. 13, 2019.

(51) Int. Cl.
*H04W 36/00* (2009.01)
*H04W 36/14* (2009.01)
(Continued)

(52) U.S. Cl.
CPC ... *H04W 36/0009* (2018.08); *H04W 36/0069* (2018.08); *H04W 36/14* (2013.01); *H04W 48/10* (2013.01); *H04W 76/28* (2018.02)

(58) Field of Classification Search
CPC ......... H04W 36/0009; H04W 36/0069; H04W 36/14; H04W 48/10; H04W 76/28; H04W 48/00
See application file for complete search history.

(56) References Cited

U.S. PATENT DOCUMENTS 8,942,205 B2    1/2015  Mach et al.
10,917,769 B2 *  2/2021  Kim ........................ H04L 27/26
(Continued)

FOREIGN PATENT DOCUMENTS

CN        106165491 A      2/2020
EP          3417657 B1    11/2020
(Continued)

OTHER PUBLICATIONS

International Search Report and Written Opinion dated Feb. 10, 2021 issued in PCT Application No. PCT/IB2020/060660, consisting of 15 pages.
3GPP TSG GERAN #40 TDoc GP-081673; Source: Nokia Siemens Networks & Nokia Corporation; Agenda Item: 6.3; Title: Subscriber Profile in GERAN; Nov. 17-21, 2008, Miami, USA, consisting of 8 pages.
(Continued)

*Primary Examiner* — Schquita D Goodwin
(74) *Attorney, Agent, or Firm* — Weisberg I.P. Law, P.A.

(57) ABSTRACT

A method, system and apparatus are disclosed. According to one or more embodiments, a network node for communicating with a wireless device is provided. The network node includes processing circuitry configured to: indicate a plurality of sets of parameters for IDLE/INACTIVE mode mobility parameters, and indicate one of the plurality of sets of parameters for the wireless device to implement.

14 Claims, 5 Drawing Sheets

(51) Int. Cl.
  *H04W 48/10*          (2009.01)
  *H04W 76/28*          (2018.01)

(56)          References Cited

U.S. PATENT DOCUMENTS

| | | | | |
|---|---|---|---|---|
| 2013/0188499 | A1 | 7/2013 | Mach et al. | |
| 2019/0306827 | A1* | 10/2019 | Agiwal | H04L 5/001 |
| 2020/0107266 | A1* | 4/2020 | Liao | H04W 76/28 |
| 2020/0107267 | A1* | 4/2020 | Wu | H04W 76/28 |
| 2020/0329455 | A1* | 10/2020 | Ryu | H04W 76/28 |
| 2021/0045093 | A1* | 2/2021 | Rao | H04W 76/14 |
| 2021/0099924 | A1* | 4/2021 | Shih | H04W 36/0061 |
| 2021/0243777 | A1* | 8/2021 | Tsai | H04W 74/006 |
| 2021/0410107 | A1* | 12/2021 | Park | H04W 68/02 |
| 2022/0190886 | A1* | 6/2022 | Islam | H04W 72/044 |
| 2022/0225182 | A1* | 7/2022 | Tan | H04W 36/0058 |
| 2022/0295318 | A1* | 9/2022 | Hwang | H04W 48/12 |
| 2022/0393794 | A1* | 12/2022 | Wang | H04L 1/188 |

FOREIGN PATENT DOCUMENTS

| | | | |
|---|---|---|---|
| WO | 2016/107887 | A1 | 7/2016 |
| WO | 2018/087737 | A1 | 5/2018 |

OTHER PUBLICATIONS

3GPP TS 38.331 V15.7.0 (Sep. 2019) 3rd Generation Partnership Project; Technical Specification Group Radio Access Network; NR; Radio Resource Control (RRC) Protocol Specification (Release 15), consisting of 527 pages.

R2-2003494 3GPP TSG-RAN WG2 Meeting #109bis-e; Source: CMCC, Ericsson, Softbank, vivo; Title: 38.331 CR to Introduce Alternative Cell Reselection Priority for SA; Electroctronic, Apr. 20-30, 2020, consisting of 9 pages.

R2-1915219 3GPP TSG-RAN WG2 Meeting #108; Source: CMCC, Huawei, vivo, ZTE, OPPO, xiaomi; Title: Further Consideration on EN-DC Cell Reselection; Agenda Item: 6.20.1; Document for: Discussion and Decision; Reno, USA Nov. 18-22, 2019, consisting of 3 pages.

3GPP TS 38.331 V15.6.0 (Jun. 2019) 3rd Generation Partnership Project; Technical Specification Group Radio Access Network; NR; Radio Resource Control (RRC) Protocol Specification (Release 15), consisting of 519 pages.

Chinese Office Action and English language Summary translation of the Chinese Office Action dated Oct. 27, 2023 issued in corresponding Chinese Application No. 202080092945.4, consisting of 23 pages.

* cited by examiner

UE GROUP BASED CELL RESELECTION

CROSS-REFERENCE TO RELATED APPLICATIONS

This application is a Submission Under 35 U.S.C. § 371 for U.S. National Stage Patent Application of International Application No.: PCT/IB2020/060660, filed Nov. 12, 2020 entitled "UE GROUP BASED CELL RESELECTION," which claims priority to U.S. Provisional Application No. 62/934,837, filed Nov. 13, 2019, entitled "UE GROUP BASED CELL RESELECTION," the entireties of both of which are incorporated herein by reference.

TECHNICAL FIELD

The present disclosure relates to wireless communications, and in particular, to selection from among multiple sets of parameters for wireless devices operating in a particular mode such as, e.g., IDLE mode, INACTIVE mode, etc.

BACKGROUND

IDLE Mode and INACTIVE Mode Mobility

In Third Generation Partnership Project (3GPP) systems like New Radio (NR, also referred to as 5$^{th}$ Generation) and Long Term Evolution (LTE, also referred to as 4$^{th}$ Generation), when in IDLE mode and INACTIVE mode, the wireless device is still associated to a cell, even though not actively communicating with that cell. This is referred to as the wireless device is "camping" on a cell. IDLE mode and/or INACTIVE mode may be Radio Resource Control (RRC) IDLE modes and/or RRC INACTIVE modes, respectively.

As the wireless device moves around, the wireless device may need to change which cell it is camping on. Such mobility is controlled by the network/network node using thresholds and priorities which the network node provides to the wireless device. The network node can provide such thresholds to the wireless device indicating, for example, how much better (in term of, for example, a quantifiable value or measurement) another cell must be than the current cell, for the wireless device to move to that other cell. Also, the network node provides priorities to the wireless device which indicates for example which frequency the wireless device may prefer to be camping on.

The network node can provide the parameters to the wireless device via broadcast signaling or by dedicated signaling. The wireless device applies the broadcast parameters, unless the wireless device has been provided with dedicated priorities, or in other words: the wireless device prioritizes dedicated signaling over broadcast signaling.

Dedicated signaling helps provide a network node provide load balance as the network node can influence how wireless devices prioritize a certain frequency, hence distributing the wireless devices among different cells. Even though the wireless device is not generating any traffic when the wireless device is in IDLE/INACTIVE mode, the wireless device may cause load if/when the wireless device enters CONNECTED mode. So if all or multiple wireless devices are camped on the same cell, they would end up connecting to that cell if/when they eventually enter CONNECTED mode, which may cause overload of the network node. Hence the network node can help ensure sure, using dedicated priorities, that some wireless devices camp on a first frequency, while other wireless devices camp on another frequency.

However, lacking in existing systems is flexibility in providing and applying different parameters for IDLE/INACTIVE mode mobility.

SUMMARY

As discussed above, the network node can help ensure sure, using dedicated priorities, that some wireless devices camp on a first frequency, while other wireless devices camp on another frequency. Some of these features may only be supported by certain cells in the network. For example, as described in 3GPP contribution document (TDoc) R2-1915219, there may be some cells which support EN-DC (EUTRAN-NR-Dual-Connectivity) while some cells do not support such functionality. Further, it may be preferable in some scenarios that wireless devices which support EN-DC to prioritize camping on cells supporting EN-DC, while wireless devices not supporting EN-DC should prioritize other cells.

What is described in 3GPP TDoc R2-1915219 is that the network may provide parameters for IDLE mode mobility which are specific for EN-DC and parameters which are applicable to all other wireless devices. However, this may become limiting since there may be other types of wireless devices for which similar behavior (wireless devices group specific cell reselection) may be used, but the solution presented in 3GPP TDoc R2-1915219 may not allow for this due to its lack of flexibility.

Some embodiments advantageously provide methods, systems, and apparatuses for selection from among multiple sets of parameters for wireless devices in IDLE mode, INACTIVE mode, etc., or for wireless devices in RRC connected mode.

In some embodiments, there is provided a method in a wireless device for maintaining IDLE/INACTIVE mode mobility parameters wherein the wireless device performs one or more of:

receiving multiple sets of broadcasted parameters for IDLE/INACTIVE mode mobility parameters, receiving an indication from the network indicating which set of parameters the wireless device may or should or shall apply, determining based on the indication which parameter set to apply, and/or applying the determined parameter set.

In some embodiments, there is provided a method in a network node for maintaining IDLE/INACTIVE mode mobility parameters wherein the network node performs one or more of:

broadcasting multiple sets parameters for IDLE/INACTIVE mode mobility parameters, determining which set of the broadcasted parameters the wireless device may or should or shall apply, and/or sending to a wireless device an indication of which of the set of parameters the wireless device may or should or shall apply.

According to one aspect of the disclosure, a network node for communicating with a wireless device is provided. The network node includes processing circuitry configured to: indicate a plurality of sets of parameters for IDLE/INACTIVE mode mobility parameters and indicate one of the plurality of sets of parameters for the wireless device to implement.

According to one or more embodiments, the indication of the plurality of sets of parameters is broadcast in system information block, SIB, signaling. According to one or more embodiments, the indication of the one of the plurality of sets of parameters for the wireless device to implement is transmitted in radio resource control, RRC, signaling. According to one or more embodiments, the RRC signaling is a RRC release message.

According to one or more embodiments, the indication of the one of the plurality of sets of parameters for the wireless device to implement is configured to trigger a timer associated with discarding the one of the plurality of sets of parameters. According to one or more embodiments, a first set of parameters of the plurality of sets of parameters prioritizes a first frequency for IDLE/INACTIVE mode; and a second set of parameters of the plurality of sets of parameters prioritizes a second frequency for IDLE/INAC-TIVE mode. According to one or more embodiments, the plurality of sets of parameters correspond to a plurality of sets of cell reselection parameters.

According to one or more embodiments, the processing circuitry is configured to determine to indicate the one of the plurality of sets of parameters for the wireless device to implement based at least on wireless device capability, version of a wireless communications standard implemented by the wireless device and mobility state of the wireless device. According to one or more embodiments, a first set of parameters of the plurality of sets of parameters corresponds to a legacy set of parameters; and a second set of parameters of the plurality of sets of parameters corresponds to an alternative set of parameters to the legacy set.

According to another aspect of the disclosure, a wireless device for communicating with a network node is provided. The wireless device includes processing circuitry configured to receive an indication of a plurality of sets of parameters for IDLE/INACTIVE mode mobility parameters, and receive an indication one of the plurality of sets of parameters for the wireless device to implement.

According to one or more embodiments, the processing circuitry is configured to discard the indication of the one of the plurality of sets of parameters for the wireless device to implement based on expiration of a timer. According to one or more embodiments, the processing circuitry is configured to initiate the timer based on receiving the indication of one of the plurality of sets of parameters for the wireless device to implement. According to one or more embodiments, the processing circuitry is configured to discard the indication of the one of the plurality of sets of parameters for the wireless device to implement based on at least one of: movement of the wireless device out of an area; and a determination that the indication of the one of the plurality of sets of parameters for the wireless device to implement is not supported by a cell.

According to one or more embodiments, the indication of the plurality of sets of parameters is received in a broadcast of system information block, SIB, signaling. According to one or more embodiments, the indication of the one of the plurality of sets of parameters for the wireless device to implement is received in radio resource control, RRC, signaling. According to one or more embodiments, the RRC signaling is a RRC release message.

According to one or more embodiments, a first set of parameters of the plurality of sets of parameters prioritizes a first frequency for the IDLE/INACTIVE mode; and a second set of parameters of the plurality of sets of param-eters prioritizes a second frequency for the IDLE/INAC-TIVE mode. According to one or more embodiments, the plurality of sets of parameters correspond to a plurality of sets of cell reselection parameters. According to one or more embodiments, a first set of parameters of the plurality of sets of parameters corresponds to a legacy set of parameters; and a second set of parameters of the plurality of sets of parameters corresponds to an alternative set of parameters to the legacy set.

According to another aspect of the disclosure, a method performed by a network node that is configured to commu-nicate with a wireless device is provided. A plurality of sets of parameters for IDLE/INACTIVE mode mobility param-eters are indicated. One of the plurality of sets of parameters for the wireless device to implement is indicated.

According to one or more embodiments, the indication of the plurality of sets of parameters is broadcast in system information block, SIB, signaling. According to one or more embodiments, the indication of the one of the plurality of sets of parameters for the wireless device to implement is transmitted in radio resource control, RRC, signaling. According to one or more embodiments, the RRC signaling is a RRC release message.

According to one or more embodiments, the indication of the one of the plurality of sets of parameters for the wireless device to implement is configured to trigger a timer asso-ciated with discarding the one of the plurality of sets of parameters. According to one or more embodiments, a first set of parameters of the plurality of sets of parameters prioritizes a first frequency for IDLE/INACTIVE mode; and a second set of parameters of the plurality of sets of parameters prioritizes a second frequency for IDLE/INAC-TIVE mode. According to one or more embodiments, the plurality of sets of parameters correspond to a plurality of sets of cell reselection parameters.

According to one or more embodiments, a determination is made to indicate the one of the plurality of sets of parameters for the wireless device to implement based at least on wireless device capability, version of a wireless communications standard implemented by the wireless device and mobility state of the wireless device. According to one or more embodiments, a first set of parameters of the plurality of sets of parameters corresponds to a legacy set of parameters; and a second set of parameters of the plurality of sets of parameters corresponds to an alternative set of parameters to the legacy set.

According to another aspect of the disclosure, a method performed by a wireless device that is configured to com-municate with a network node is provided. An indication of a plurality of sets of parameters for IDLE/INACTIVE mode mobility parameters is received. An indication of one of the plurality of sets of parameters for the wireless device to implement is received.

According to one or more embodiments, the indication of the one of the plurality of sets of parameters for the wireless device to implement is discarded based on expiration of a timer. According to one or more embodiments, the timer is initiated based on receiving the indication of one of the plurality of sets of parameters for the wireless device to implement. According to one or more embodiments, the indication of the one of the plurality of sets of parameters for the wireless device to implement is discarded based on at least one of: movement of the wireless device out of an area; and a determination that the indication of the one of the plurality of sets of parameters for the wireless device to implement is not supported by a cell.

According to one or more embodiments, the indication of the plurality of sets of parameters is received in a broadcast of system information block, SIB, signaling. According to one or more embodiments, the indication of the one of the plurality of sets of parameters for the wireless device to implement is received in radio resource control, RRC, signaling. According to one or more embodiments, the RRC signaling is a RRC release message.

According to one or more embodiments, a first set of parameters of the plurality of sets of parameters prioritizes a first frequency for the IDLE/INACTIVE mode; and a second set of parameters of the plurality of sets of parameters prioritizes a second frequency for the IDLE/INACTIVE mode. According to one or more embodiments, the plurality of sets of parameters correspond to a plurality of sets of cell reselection parameters. According to one or more embodiments, a first set of parameters of the plurality of sets of parameters corresponds to a legacy set of parameters; and a second set of parameters of the plurality of sets of parameters corresponds to an alternative set of parameters to the legacy set.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
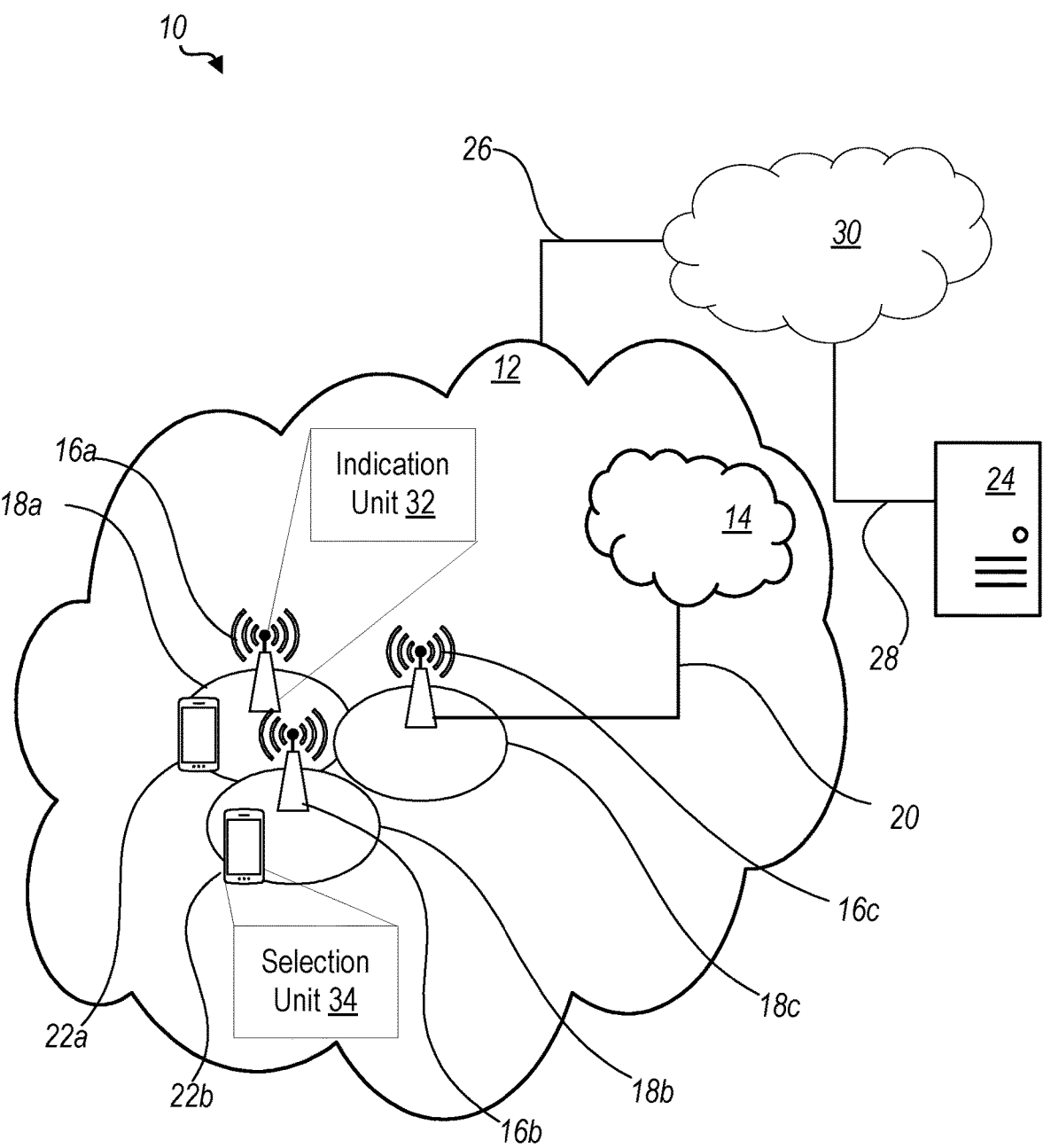
FIG. 1 is a schematic diagram of an example network architecture illustrating a communication system connected via an intermediate network to a host computer according to the principles in the present disclosure.

One or more embodiments of the present disclosure provide for a flexible way to allow different (group of) wireless device to apply different parameters for IDLE/INACTIVE mode mobility which can be used to provide different parameters to different (groups of) wireless device based on different criteria determined by the network node.

Before describing in detail exemplary embodiments, it is noted that the embodiments reside primarily in combinations of apparatus components and processing steps related to selection from among multiple sets of parameters for wireless devices in IDLE mode, INACTIVE mode, etc.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

It will herein be used the term "legacy signaling", "legacy fields" and similar. This here refers to signaling and fields which are defined in an existing version of the specification. For example, if this feature is implemented in version 16 of the NR/LTE specifications, then a field which is defined in Release (Rel-15) of those specifications would be considered a legacy field and signaling using this field would be considered legacy signaling.

An indication generally may explicitly and/or implicitly indicate the information it represents and/or indicates such as with respect to the indication of multiple sets of parameters for selection from among multiple sets of parameters for wireless devices in IDLE mode, INACTIVE mode, etc. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or to one of multiple sets of parameters for selection. A terminal or wireless device or node may be adapted to configure itself, e.g., according to information or data in a memory of the terminal or wireless device. Configuring a node or terminal or wireless device by another device or node or a network may refer to and/or comprise transmitting information and/ or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

In one or more embodiments, IDLE mode and INACTIVE mode are used interchangeably herein and may be denoted by IDLE/INACTIVE mode.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide selection from among multiple sets of parameters for wireless devices in IDLE mode, INACTIVE mode, etc.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indication unit 32 which is configured to perform one or more network node 16 functions as described herein such as with respect to indication of multiple sets of parameters for selection from among multiple sets of parameters for wireless devices in IDLE mode, INACTIVE mode, etc. A wireless device 22 is configured to include a selection unit 34 which is configured to perform one or more wireless device 22 function as described herein such as with respect to an indication of multiple sets of parameters for selection from among multiple sets for parameters for wireless devices in IDLE mode, INACTIVE mode, etc.

Example implementations, in accordance with an embodiment, of the WD 22, network node 16 and host computer 24 discussed in the preceding paragraphs will now be described

Figure 2:
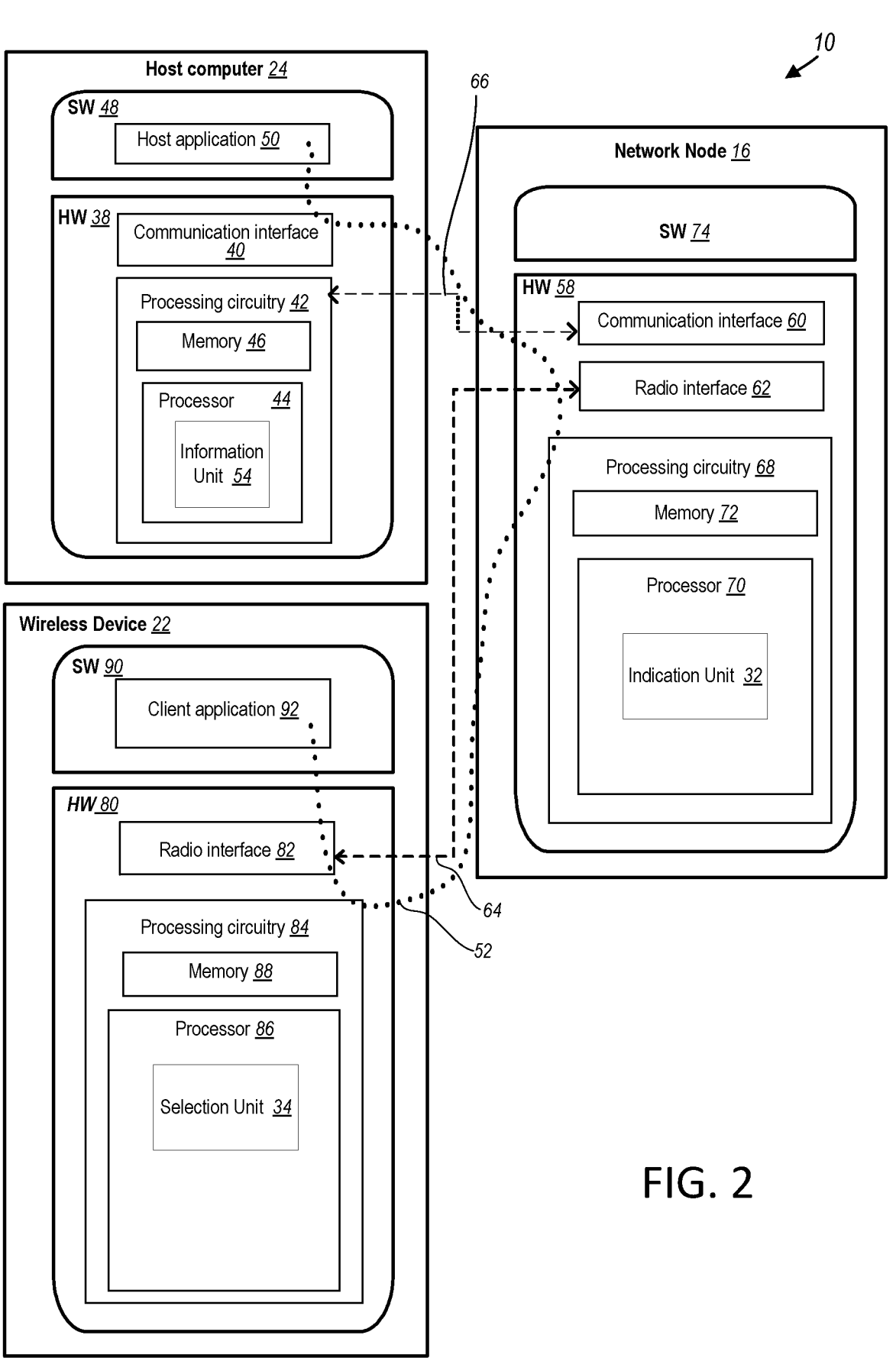
FIG. 2 is a block diagram of a host computer communicating via a network node with a wireless device over an at least partially wireless connection according to some embodiments of the present disclosure.

10 with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to determine, process, provide, communication, transmit, receive, signal, forward, relay, store, etc., information/data (as described herein) related to indication of multiple sets of parameters for selection from among multiple sets of parameters for wireless devices in IDLE mode, INACTIVE mode, etc.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform one or more network node 16 functions as described herein such as with respect to the indication of multiple sets of parameters for selection from among multiple sets of parameters for wireless devices in IDLE mode, INACTIVE mode, etc.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a selection unit 34 configured to perform one or more wireless device 22 functions as described herein such as with respect to indication of multiple sets of parameters for selection from among multiple sets of parameters for wireless devices in IDLE mode, INACTIVE mode, etc.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as indication unit 32, and selection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
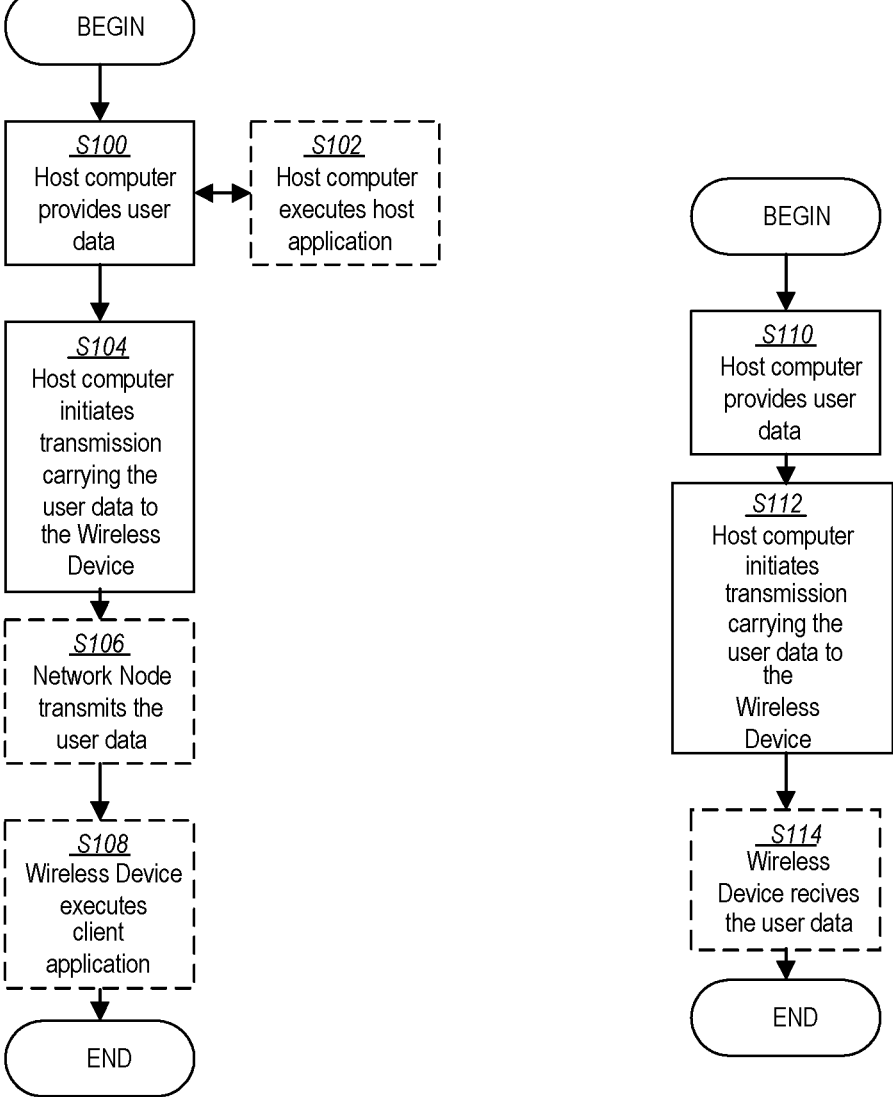
FIG. 3 is a flowchart illustrating example methods implemented in a communication system including a host computer, a network node and a wireless device for executing a client application at a wireless device according to some embodiments of the present disclosure.
FIG. 4 is a flowchart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
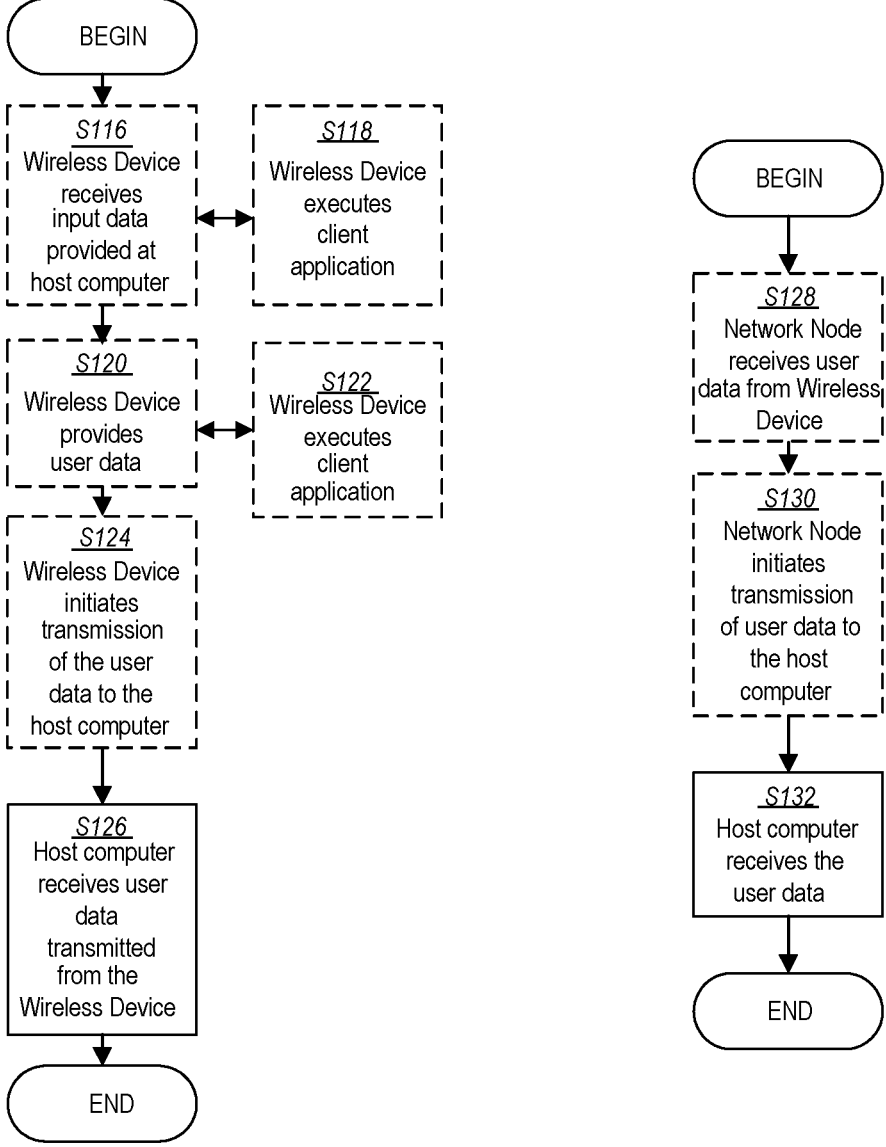
FIG. 5 is a flowchart illustrating example methods implemented in a communication system including a host computer, a network node and a wireless device for receiving user data from the wireless device at a host computer according to some embodiments of the present disclosure.
FIG. 6 is a flowchart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
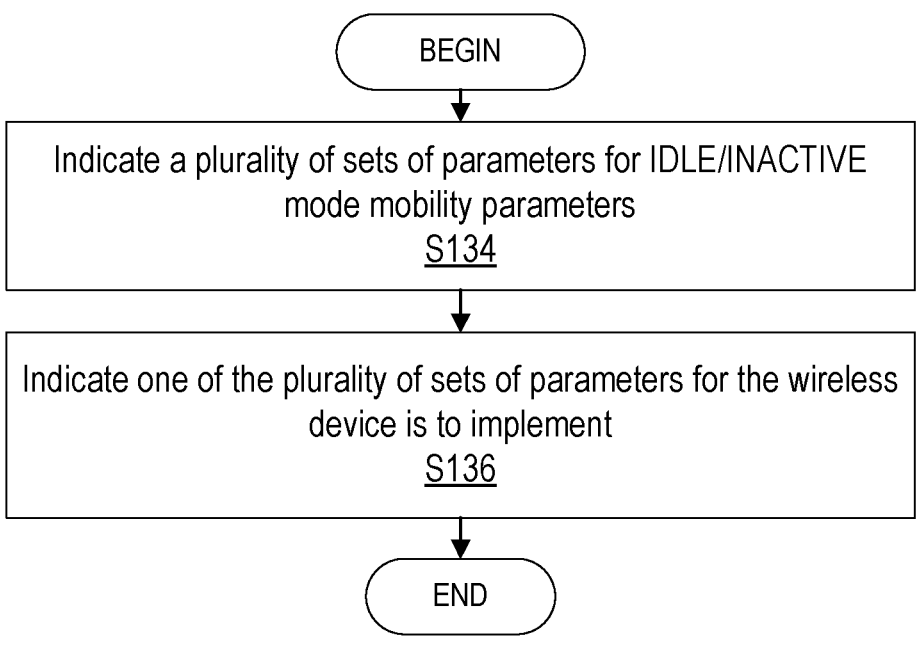
FIG. 7 is a flowchart of an example process in a network node according to some embodiments of the present disclosure.

FIG. 7 is a flowchart of an example process in a network node 16 according to some embodiments of the present disclosure. One or more Blocks and/or functions performed by network node 16 may be performed by one or more elements of network node 16 such as by indication unit 32 in processing circuitry 68, processor 70, communication interface 60, radio interface 62, etc. In one or more embodiments, network node 16, such as via one or more of processing circuitry 68, processor 70, indication unit 32, communication interface 60 and radio interface 62, is configured to indicate (Block S134) a plurality of sets of parameters for IDLE/INACTIVE mode mobility parameters, as described herein. In one or more embodiments, network node 16, such as via one or more of processing circuitry 68, processor 70, indication unit 32, communication interface 60 and radio interface 62, is configured to indicate (Block S136) one of the plurality of sets of parameters for the wireless device 22 to implement, as described herein.

According to one or more embodiments, the plurality of sets of parameters are indicated based at least in part on at least one of an identifier and a location of the identifier within signaling. According to one or more embodiments, the indication of one of the plurality of sets is provided by a parameter set indication. According to one or more embodiments, the parameter set indication is determined based at least in part on wireless device 22 capability, release version of the wireless device 22 and mobility state of the wireless device 22. According to one or more embodiments, the plurality of sets of parameters includes at least one set for EURAN-NR-Dual-Connectivity (EN-DC) capable wireless devices 22 and at least one set for non-EN-DC capable wireless devices 22.

According to one or more embodiments, the indication of the plurality of sets of parameters is broadcast in system information block, SIB, signaling. According to one or more embodiments, the indication of the one of the plurality of sets of parameters for the wireless device 22 to implement is transmitted in radio resource control, RRC, signaling. According to one or more embodiments, the RRC signaling is a RRC release message.

According to one or more embodiments, the indication of the one of the plurality of sets of parameters for the wireless device 22 to implement is configured to trigger a timer associated with discarding the one of the plurality of sets of parameters. According to one or more embodiments, a first set of parameters of the plurality of sets of parameters prioritizes a first frequency for IDLE/INACTIVE mode, and a second set of parameters of the plurality of sets of parameters prioritizes a second frequency for IDLE/INAC-TIVE mode. According to one or more embodiments, the plurality of sets of parameters correspond to a plurality of sets of cell reselection parameters.

According to one or more embodiments, the processing circuitry is configured to determine to indicate the one of the plurality of sets of parameters for the wireless device 22 to implement based at least on wireless device capability, version of a wireless communications standard implemented by the wireless device 22 and mobility state of the wireless device 22. According to one or more embodiments, a first set of parameters of the plurality of sets of parameters corresponds to a legacy set of parameters, and a second set of parameters of the plurality of sets of parameters corresponds to an alternative set of parameters to the legacy set.

Figure 8:
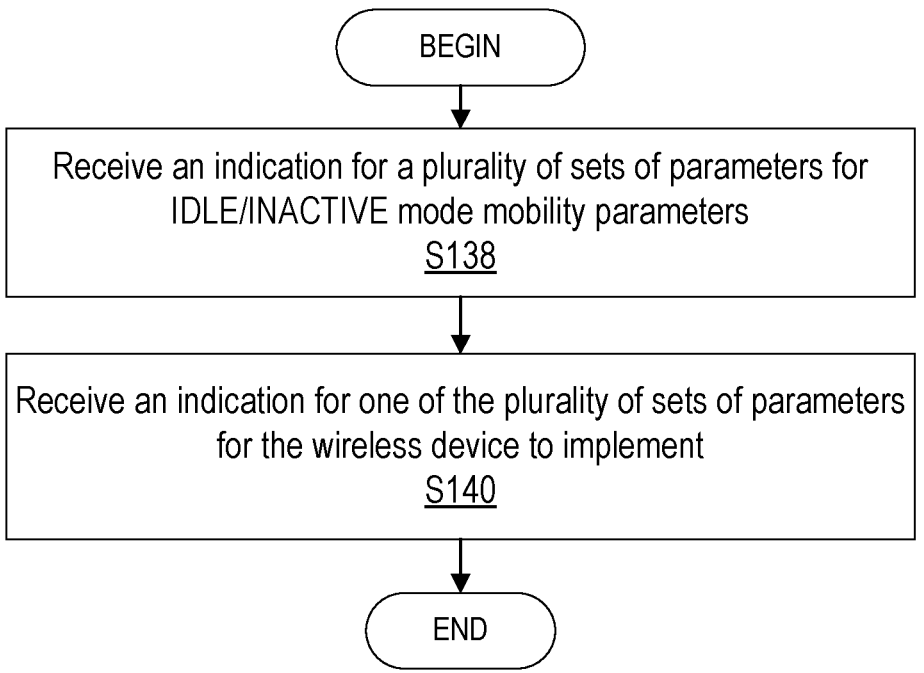
FIG. 8 is a flowchart of an example process in a wireless device according to some embodiments of the present disclosure.

FIG. 8 is a flowchart of an example process in a wireless device 22 according to some embodiments of the present disclosure. One or more Blocks and/or functions performed by wireless device 22 may be performed by one or more elements of wireless device 22 such as by selection unit 34 in processing circuitry 84, processor 86, radio interface 82, etc. In one or more embodiments, wireless device 22, such as via one or more of processing circuitry 84, processor 86, selection unit 34 and radio interface 82, is configured to receive (Block S138) an indication for a plurality of sets of parameters for IDLE/INACTIVE mode mobility parameters, as described herein. In one or more embodiments, wireless device 22, such as via one or more of processing circuitry 84, processor 86, selection unit 34 and radio interface 82, is configured to receive (Block S140) an indication for one of the plurality of sets of parameters for the wireless device 22 to implement, as described herein.

According to one or more embodiments, the plurality of sets of parameters are indicated based at least in part on at least one of an identifier and a location of the identifier within signaling. According to one or more embodiments, the indication of one of the plurality of sets is provided by a parameter set indication. According to one or more embodiments, the parameter set indication is based at least in part on wireless device 22 capability, release version of the wireless device 22 and mobility state of the wireless device 22. According to one or more embodiments, the plurality of sets of parameters includes at least one set for EURAN-NR-Dual-Connectivity (EN-DC) capable wireless devices 22 and at least one set for non-EN-DC capable wireless devices 22. According to one or more embodiments, if the one of the plurality of sets of parameters to implement is not valid, implementing, such as via one or more of processing circuitry 84, processor 86, selection unit 34 and radio interface 82, a default one of the plurality of sets of parameters.

According to one or more embodiments, the processing circuitry 84 is configured to discard the indication of the one of the plurality of sets of parameters for the wireless device 22 to implement based on expiration of a timer. According to one or more embodiments, the processing circuitry 84 is configured to initiate the timer based on receiving the indication of one of the plurality of sets of parameters for the wireless device 22 to implement. According to one or more embodiments, the processing circuitry 84 is configured to discard the indication of the one of the plurality of sets of parameters for the wireless device 22 to implement based on at least one of: movement of the wireless device 22 out of an area; and a determination that the indication of the one of the plurality of sets of parameters for the wireless device 22 to implement is not supported by a cell.

According to one or more embodiments, the indication of the plurality of sets of parameters is received in a broadcast of system information block, SIB, signaling. According to one or more embodiments, the indication of the one of the plurality of sets of parameters for the wireless device 22 to implement is received in radio resource control, RRC, signaling. According to one or more embodiments, the RRC signaling is a RRC release message.

According to one or more embodiments, a first set of parameters of the plurality of sets of parameters prioritizes a first frequency for the IDLE/INACTIVE mode; and a second set of parameters of the plurality of sets of parameters prioritizes a second frequency for the IDLE/INACTIVE mode. According to one or more embodiments, the plurality of sets of parameters correspond to a plurality of sets of cell reselection parameters. According to one or more embodiments, a first set of parameters of the plurality of sets of parameters corresponds to a legacy set of parameters; and a second set of parameters of the plurality of sets of parameters corresponds to an alternative set of parameters to the legacy set.

Having described the general process flow of arrangements of the disclosure and having provided examples of hardware and software arrangements for implementing the processes and functions of the disclosure, the sections below provide details and examples of arrangements for selection from among multiple sets of parameters for wireless devices in IDLE mode, INACTIVE mode, etc.

Embodiments provide selection from among multiple sets of parameters for wireless devices 22 in IDLE mode and/or INACTIVE mode (IDLE/INACTIVE mode), etc.

Having generally described arrangements for indication of multiple sets of parameters and selection from among multiple sets of parameters for wireless devices in IDLE mode, INACTIVE mode, etc., details for these arrangements, functions and processes are provided as follows, and which may be implemented by the network node 16, wireless device 22 and/or host computer 24.

Broadcasting of Multiple Idle/Inactive Mode Mobility Parameters Sets

According to one or more embodiments, a network node 16 such as via one or more of processing circuitry 68, processor 70, radio interface 62, indication unit 32, etc. broadcasts multiple sets of parameters for one or more wireless devices 22 to use when performing mobility among cells when the wireless devices 22 are in IDLE mode, INACTIVE mode, etc.

In NR/LTE specifications, the network node 16 such as via one or more of processing circuitry 68, processor 70, radio interface 62, indication unit 32, etc. sends a set of such parameters as described herein. For example, the wireless device 22 which is in IDLE mode or INACTIVE mode applies these thresholds to determine which cell and/or frequency the wireless device 22 should camp on. However, according to the teachings described herein, the network node 16 such as via one or more of processing circuitry 68, processor 70, radio interface 62, indication unit 32, etc. may provide multiple such set of parameters.

The different sets of parameters may be identified by a certain identifier (in the example ASN.1 implementation, this is provided as ueCategoryIndex). For example, an index which may be an integer-value. This integer value may be signaled together such as with one or more other integer values.

Another approach to identifying the different sets of parameters would be to distinguish the different sets of parameters based on the location of the parameters such as, for example, a location within the signaling. For example, the sets of parameters could be distinguished based on whether they are provided in legacy fields, or in a new field.

If the signaling supports signaling multiple additional (i.e., in addition to the legacy parameters) sets of parameters such as via one or more of processing circuitry 68, processor 70, radio interface 62, indication unit 32, etc., the additional sets may be provided in a list. In this case, it may not be necessary to assign an explicit identifier to them, instead it may be such that they have an implicit identifier based on where in the list they are provided. For example, the first set in the list may be associated with an index 1 (or 2), the second set in the list may be associated with an index 2 (or 3), and so on. It may be so that the parameters in the legacy fields may be associated with an index 0 (or 1).

One set of parameters may be considered to be a default set of parameters. The default parameters may be those parameters sent in legacy signaling.

Below is an example showing how such multiple-sets can be implemented in 3GPP Technical Specification (TS) 38.331 version (v)15.6.0. The change in 3GPP TS 38.331 v 15.6.0 is shown with underlined and bold text. Some, for this example, irrelevant parts are omitted (It is to be noted that a similar set of changes may be equally applicable for System Information Block Type 4 (SIB4), inter-frequency reselection parameters and System Information Block Type 5 (SIB5), inter-radio access technology (inter-RAT) reselection parameters as well).

Beginning of example (with explicit indication of the ueCategoryType):

SIB2

SIB2 contains cell re-selection information common for intra-frequency, inter-frequency and/or inter-RAT cell re-selection (i.e., is applicable for more than one type of cell re-selection but not necessarily all) as well as intra-frequency cell re-selection information other than neighboring cell related.

SIB2 Information Element

```
-- ASN1START
-- TAG-SIB2-START
SIB2 ::= SEQUENCE {
    cellReselectionInfoCommon SEQUENCE {
        nrofSS-BlocksToAverage INTEGER
        (2..maxNrofSS-BlocksToAverage)
    OPTIONAL, -- Need S
        absThreshSS-BlocksConsolidation ThresholdNR
    OPTIONAL, -- Need S
        rangeToBestCell RangeToBestCell
    OPTIONAL, -- Need R
        q-Hyst ENUMERATED {
            dB0, dB1, dB2, dB3, dB4, dB5, dB6, dB8, dB10,
            dB12, dB14, dB16, dB18, dB20, dB22, dB24},
        speedStateReselectionPars SEQUENCE {
            mobilityStateParameters MobilityStateParameters,
            q-HystSF SEQUENCE {
                sf-Medium ENUMERATED {dB-6, dB-4, dB-2, dB0},
                sf-High ENUMERATED {dB-6, dB-4, dB-2, dB0}
            }
        } OPTIONAL, -- Need R
        ...
    },
    cellReselectionServingFreqInfo SEQUENCE {
        s-NonIntraSearchP ReselectionThreshold
    OPTIONAL, -- Need S
        s-NonIntraSearchQ ReselectionThresholdQ
    OPTIONAL, -- Need S
        threshServingLowP ReselectionThreshold,
        threshServingLowQ ReselectionThresholdQ
    OPTIONAL, -- Need R
        cellReselectionPriority CellReselectionPriority,
        cellReselectionSubPriority CellReselectionSubPriority
    OPTIONAL, -- Need R
        ...
    },
```

-continued

```
    intraFreqCellReselectionInfo SEQUENCE {
        q-RxLevMin Q-RxLevMin,
        q-RxLevMinSUL Q-RxLevMin
    OPTIONAL, -- Need R
        q-QualMin Q-QualMin OPTIONAL,
    -- Need S
        s-IntraSearchP ReselectionThreshold,
        s-IntraSearchQ ReselectionThresholdQ
    OPTIONAL, -- Need S
        t-ReselectionNR T-Reselection,
        frequencyBandList MultiFrequencyBandListNR-SIB
    OPTIONAL, -- Need S
        frequencyBandListSUL MultiFrequencyBandListNR-SIB
    OPTIONAL, -- Need R
        p-Max P-Max OPTIONAL, --
    Need R
        smtc SSB-MTC OPTIONAL, --
    Need R
        ss-RSSI-Measurement SS-RSSI-Measurement
    OPTIONAL, -- Need R
        ssb-ToMeasure SSB-ToMeasure OPTIONAL,
    -- Need R
        deriveSSB-IndexFromCell BOOLEAN,
        ...,
        [[
        t-ReselectionNR-SF SpeedStateScaleFactors
    OPTIONAL -- Need N
        ]]
    },
    ...,
    [[ cellReselectionPriorityList-r16
    CellReselectionPriorityList-r16
    OPTIONAL -- Need N
    ]]
}
RangeToBestCell ::= Q-OffsetRange
CellReselectionPriorityList-r16 ::= SEQUENCE (SIZE
(1..maxNrofUETypes)) OF CellReselectionPriorities
CellReselectionPriorities ::= SEQUENCE {
    ueCategoryIndex INTEGER (1.. maxNrofUETypes),
    cellReselectionPriority CellReselectionPriority,
    cellReselectionSubPriority CellReselectionSubPriority
OPTIONAL --Need R
}
-- TAG-SIB2-STOP
-- ASN1STOP
```

Wireless Device 22 Determines which Parameters Set to Apply

In one or more embodiments, a network node 16 such as via one or more of processing circuitry 68, processor 70, radio interface 62, indication unit 32, etc. indicates to a wireless device 22 an indication used by the wireless device 22 to determine which set, among multiple sets, of cell (re)selection parameters the wireless device 22 may consider. This indication may be referred to as a parameter set indication.

The parameter set indication may be indicated with dedicated signaling from the network node 16 such as via one or more of processing circuitry 68, processor 70, radio interface 62, indication unit 32, etc. to the wireless device 22. For example, signaled in a message which is used to move the wireless device 22 from CONNECTED mode to an IDLE/INACTIVE mode, such as an RRC Release-message.

Below is an example showing how such an indication can be implemented in 3GPP TS 38.331 v15.6.0. The change is shown with underlined and bold text. Some, for this example, irrelevant parts are omitted.

Beginning of Example:
RRCRelease
The RRCRelease message is used to command the release of an RRC connection or the suspension of the RRC connection.

Signalling radio bearer: SRB1
RLC-SAP: AM
Logical channel: DCCH
Direction: Network to UE RRCRelease message

```
-- ASN1START
-- TAG-RRCRELEASE-START
RRCRelease ::= SEQUENCE {
    rrc-TransactionIdentifier RRC-TransactionIdentifier,
    criticalExtensions CHOICE {
        rrcRelease RRCRelease-IEs,
        criticalExtensionsFuture SEQUENCE { }
    }
}
RRCRelease-IEs ::= SEQUENCE {
    redirectedCarrierInfo RedirectedCarrierInfo
OPTIONAL, -- Need N
    cellReselectionPriorities CellReselectionPriorities
OPTIONAL, -- Need R
    suspendConfig SuspendConfig
OPTIONAL, -- Need R
    deprioritisationReq SEQUENCE {
        deprioritisationType ENUMERATED {frequency, nr},
        deprioritisationTimer ENUMERATED {min5, min10, min15, min30}
    } OPTIONAL, -
- Need N
    lateNonCriticalExtension OCTET STRING
OPTIONAL,
    nonCriticalExtension RRCRelease-v1540-IEs
OPTIONAL
}
RRCRelease-v1540-IEs ::= SEQUENCE {
    waitTime RejectWaitTime OPTIONAL, -- Need N
    nonCriticalExtension SEQUENCE { } OPTIONAL
}
RedirectedCarrierInfo ::= CHOICE {
    nr CarrierInfoNR,
    eutra RedirectedCarrierInfo-EUTRA,
    ...,
    cellReselectionParameterSetIndex INTEGER (1..
    maxNrofUETypes)
}
-- TAG-RRCRELEASE-STOP
-- ASN1STOP
```

End of example

Format of Indication

The indication could be an integer value and point to the index of parameters. As discussed above where it is described how the network node 16 may indicate such as via one or more of processing circuitry 68, processor 70, radio interface 62, indication unit 32, etc. for a certain set of parameters which index they are associated with.

Another approach, for the case if only two sets may be supported, is that a one-bit flag is sent such as via one or more of processing circuitry 68, processor 70, radio interface 62, indication unit 32, etc. to the wireless device 22 which, if set to a first value indicates that the wireless device 22 may or should or shall apply the parameters provided in legacy fields, while if set to a second value indicates that the wireless device 22 may or should or shall apply parameters in another set of values. The first value may be different from the second value.

If the wireless device 22 such as via one or more of processing circuitry 84, processor 86, radio interface 82, selection unit 34, etc. has not received any indication from the network node 16 regarding which parameter set the wireless device 22 may or shall apply, the wireless device 22 may apply a default set of parameters.

Multiple Parameter Set Indications

The parameter set indication may comprise and/or indicate multiple parameter sets. The network node 16 such as via one or more of processing circuitry 68, processor 70, radio interface 62, indication unit 32, etc. may indicate to the wireless device 22 that the wireless device 22 such as via one or more of processing circuitry 84, processor 86, radio interface 82, selection unit 34, etc. may or shall apply either e.g., parameter set 1 or parameter set 3. The wireless device 22 such as via one or more of processing circuitry 84, processor 86, radio interface 82, selection unit 34, etc. may be configured to apply any of e.g., parameter set 1 or parameter set 3 if they are found and the wireless device 22 such as via one or more of processing circuitry 84, processor 86, radio interface 82, selection unit 34, etc. may select based on an internal decision (e.g., based on a criterion or criteria or condition) which of set 1 and set 3 the wireless device 22 is to apply. Another approach is that the parameter set indications are associated with a priority. For example, set 3 may be given higher priority than set 1 and the wireless device 22 may apply parameter set 3 (i.e., the higher priority set) if available, otherwise the wireless device 22 such as via one or more of processing circuitry 84, processor 86, radio interface 82, selection unit 34, etc. may apply parameter set 1. If none of the indicated parameter sets are found by the wireless device 22, the wireless device 22 such as via one or more of processing circuitry 84, processor 86, radio interface 82, selection unit 34, etc. may revert to selecting an alternative parameter set. Methods for how the wireless device 22 such as via one or more of processing circuitry 84, processor 86, radio interface 82, selection unit 34, etc. may select a parameter set when the wireless device 22 does not find the indicated parameter set are described herein.

Absence of Indicated Parameter Set

If the wireless device 22 such as via one or more of processing circuitry 84, processor 86, radio interface 82, selection unit 34, etc. has received a parameter set indication but the corresponding parameter set is not detected, the wireless device 22 may apply a backup parameter set. The backup parameter set may be selected such as via one or more of processing circuitry 84, processor 86, radio interface 82, selection unit 34, etc. to be one or more of:

a default parameter set, e.g., the parameter set indicated in the legacy signaling.

a random parameter set. If the wireless device 22 has been indicated by an indication to apply parameter set 2 but only parameter set 1 and 3 are detected by the wireless device 22, the wireless device 22 may select randomly between set 1 and set 3.

a parameter set indicated based on network signaling. The wireless device 22 may be provided with an indication of which backup parameter set the wireless device 22 may apply if the wireless device 22 does not find the indicated parameter set.

Wireless Device 22 Discards the Parameter Set Indication

In one or more embodiments, the wireless device 22 such as via one or more of processing circuitry 84, processor 86, radio interface 82, selection unit 34, etc. may discard the parameter set indication upon and/or in response to one or more events. Examples of such events include one or more of:

Wireless device 22 capabilities change—The capabilities of a wireless device 22 may change. For example, a wireless device 22 may at first be capable of a feature/functionality X (e.g., EN-DC) but for some reason, the wireless device 22 may no longer be capable of feature X. The wireless device 22 can then update its capabilities such that feature X is no longer supported. This may trigger the wireless device 22 such as via one or more of processing circuitry 84, processor 86, radio interface 82, selection unit 34, etc. to discard the parameter set indication.

Wireless device 22 moves physically and/or logically out of a certain set of cells/TA/RNA/etc.—If the wireless device 22 moves out of a certain set of cells, tracking areas, RAN areas, etc. it may no longer be applicable for the wireless device 22 to keep applying the indicated parameter set, hence the wireless device 22 may discard the parameter set indication.

Timer expires—The wireless device 22 such as via one or more of processing circuitry 84, processor 86, radio interface 82, selection unit 34, etc. may discard the parameter set upon expiry of a timer. The timer may be started upon reception of the parameter set indication, or upon transitioning from a first state to another state (e.g., from CONNECTED mode to IDLE mode). The timer may be (re)started if the wireless device 22 at a later point in time again performs such transition. Consider for example that the wireless device 22 such as via one or more of processing circuitry 84, processor 86, radio interface 82, selection unit 34, etc. gets an indication when moving from CONNECTED to IDLE mode but at a later point in time the wireless device 22 such as via one or more of processing circuitry 84, processor 86, radio interface 82, selection unit 34, etc. reconnects to the network node 16 (e.g., enters CONNECTED again); if then the wireless device 22 gets moved from CONNECETED to IDLE again, the wireless device 22 may restart the timer.

The indicated parameter set is not found—If the wireless device 22 such as via one or more of processing circuitry 84, processor 86, radio interface 82, selection unit 34, etc. has received parameter set indication X, but the parameter set X is not provided from the network node 16 (at least not the cell which the wireless device 22 is associated with (e.g., camping on)) then the wireless device 22 such as via one or more of processing circuitry 84, processor 86, radio interface 82, selection unit 34, etc. may discard the indication. This is beneficial for example if the wireless device 22 such as via one or more of processing circuitry 84, processor 86, radio interface 82, selection unit 34, etc. has been indicated to apply a parameter set X but the wireless device 22 moves to a cell which does not support this feature, or does not apply parameter set X.

The wireless device 22 changes state—The wireless device 22 such as via one or more of processing circuitry 84, processor 86, radio interface 82, selection unit 34, etc. may discard the indication if the wireless device 22 moves logically to a certain state. For example, the wireless device 22 may receive the indication when the wireless device 22 is moved to INACTIVE mode, but the wireless device 22 for some reason moves to IDLE mode, and then the wireless device 22 such as via one or more of processing circuitry 84, processor 86, radio interface 82, selection unit 34, etc. may discard the indication.

The wireless device 22 changes mobility state—The wireless device 22 may change from slow mobility state wireless device to high mobility state wireless device (these states may be based at least in part on the speedStateReselectionPars provided in the system information) and the wireless device 22 type specific reselection priorities are applicable only to a certain mobility state, e.g., slow speed wireless device state. The speed state for which the wireless device type specific reselection priorities are applicable can be specific in the standard or explicitly indicated in the system information, e.g., in CellReselectionPriorities provided in the example in the "Broadcasting of multiple idle/inactive mode mobility parameters sets" section.

As used herein, a wireless device 22 "discards" or "discarding" the parameter set indication may correspond to the wireless device 22 such as via one or more of processing circuitry 84, processor 86, radio interface 82, selection unit 34, etc. actually discarding the value (e.g., removing the value from a memory of the wireless device 22). However, the wireless device 22 performing discarding may also comprise that the wireless device 22 such as via one or more of processing circuitry 84, processor 86, radio interface 82, selection unit 34, etc. considers the indication to not be valid or applicable or in other way, stops applying the indication.

Network Selection of which Parameters a Wireless Device 22 May Apply

Based on one or more of the above methods, the network node 16 can control which parameter set a certain wireless device 22 may apply. The network node 16 such as via one or more of processing circuitry 68, processor 70, radio interface 62, indication unit 32, etc. may select which parameter set a certain wireless device 22 may apply considering one or more of the following:

Wireless device 22 capabilities—The network node 16 such as via one or more of processing circuitry 68, processor 70, radio interface 62, indication unit 32, etc. may consider the capabilities of the wireless device 22 when determining which parameter set the wireless device 22 may apply. For example, wireless devices 22 which support a feature/function/configuration X (e.g., EN-DC) may be assigned to a first set of parameters, while wireless devices 22 which do not support feature X may be assigned to a second set of parameters. The network node 16 such as via one or more of processing circuitry 68, processor 70, radio interface 62, indication unit 32, etc. may further consider on which frequency bands the wireless device 22 supports a certain feature. And on which frequencies the network node 16 has enabled that feature on. For example, a wireless device 22 which supports EN-DC may only support such a feature between certain frequencies. The network node 16 such as via one or more of processing circuitry 68, processor 70, radio interface 62, indication unit 32, etc. may consider this when selecting which parameter set the wireless device 22 may apply. So even if a wireless device 22 is EN-DC capable but the wireless device 22 does not support EN-DC for a certain (e.g., wanted) frequency (combination) then the network node 16 may not indicate that this wireless device 22 may apply parameters which the network node 16 has designated to be suitable for EN-DC capable wireless devices 22.

The release version of the wireless device 22—The wireless devices 22 such as via one or more of processing circuitry 84, processor 86, radio interface 82, selection unit 34, etc. indicates to the network node 16 which release version of the specifications the wireless devices 22 have each implemented. The network node 16 such as via one or more of processing circuitry 68, processor 70, radio interface 62, indication unit 32, etc. may indicate that wireless devices 22 of a first release version may apply a first set of parameters, while wireless devices 22 of a second release version may be assigned to a second set of parameters.

The mobility state of the wireless device 22—The network node 16 such as via one or more of processing circuitry 68, processor 70, radio interface 62, indication unit 32, etc. may consider the wireless device 22's mobility state (e.g., slow, medium, high) at the time of releasing the wireless device 22 to idle/inactive state when determining which parameter set the wireless device 22 may apply. For example, a wireless device 22 of high speed is configured with priorities that do not necessarily enable faster dual connectivity associated to high frequencies whereas a slow speed is configured with priorities that enable faster EN-DC or NR-DC associated to high frequency PSCell.

Configuration of the Network Nodes

In one or more embodiments, a central node (i.e., one of the network nodes 16) of the network node 16 (e.g., an OAM node) such as via one or more of processing circuitry 68, processor 70, radio interface 62, indication unit 32, etc. determines the indices used for the different parameter sets. This may be seen as the central node coordinating the indices to use for the different parameter sets. The result of such coordination is then indicated to network nodes 16, e.g., gNBs, in the network. The coordination may be such that all nodes in a certain area (e.g. set of cells, set of Tracking Areas, set of RAN Areas, etc.) use the same index for a certain set of parameters. Alternatively, or additionally, the coordination may be such that certain index is used for the particular type of wireless devices 22.

In one example, the OAM node (e.g., a type of network node 16) such as via one or more of processing circuitry 68, processor 70, radio interface 62, indication unit 32, etc. determines that for parameter sets that are for EN-DC may have index 2, and that is indicated to network nodes 16 such that all network nodes 16 use the same index for their EN-DC parameters, if any. The central node such as via one or more of processing circuitry 68, processor 70, radio interface 62, indication unit 32, etc. may only provide such indication to network nodes 16 which support a certain feature. For example, if there is a parameter set which is for a feature X, then the central node may only indicate to the network nodes 16 which actually feature X about which index the parameters for feature X should use.

In another embodiment, the coordination between configurations and indices is performed in a distributed manner between network nodes 16. The source network node 16 such as via one or more of processing circuitry 68, processor 70, radio interface 62, indication unit 32, etc. indicates to other network nodes 16, e.g., in the tracking area, how the indices are used when releasing the wireless device 22.

Example Description of Usage of One or More Embodiments

The following describes one example way in which some embodiments described herein can be used to achieve differentiated handling of EN-DC capable wireless devices 22, compared to wireless devices 22 which do not support EN-DC.

The network such as via one or more of processing circuitry 68, processor 70, radio interface 62, indication unit 32, etc. may be configured such that EN-DC is supported by certain cells in a network. Those cells have a connection to one or more NR-cells and functionality which supports to setup Dual Connectivity (DC) for a wireless device 22, i.e. setting up "EN-DC" for the wireless device 22. However, there may be other cells in a network which do not support EN-DC. It may be so that only cells on a certain frequency layer, say Freq A supports EN-DC, while cells on Freq B do not support EN-DC.

Then, as EN-DC is an optional feature for the wireless devices 22 to support, the network/network node 16 may serve some wireless devices 22 which support EN-DC, and some wireless devices 22 which do not.

It may be preferred that the wireless devices 22 which do support EN-DC may prefer to camp on cells which support EN-DC, or by referring to the example above, to camp on cells on Freq A. However, to avoid that Freq A becomes overloaded, it may be preferred that not all wireless devices 22 camp on Freq A, hence the network/network node 16 may prefer that non-EN-DC capable wireless devices 22 may prefer to camp on Freq B, i.e., where the cells do not support EN-DC. If this is achieved, it may help ensure that an EN-DC capable wireless devices 22 camps on an EN-DC cell and if that wireless device 22 enters CONNECTED mode, it would already be on a cell which can configure EN-DC for the wireless device 22. Compare this to the case when an EN-DC capable wireless device 22 would be camping on a cell which does not support EN-DC, where the network/network node 16 may be forced to handover the wireless device 22 to an EN-DC capable cell if that the wireless device 22 enters the CONNECTED state and the wireless device 22 is to get configured with EN-DC.

The embodiments above allow instead that the network/ network node 16 broadcast two sets of parameters for IDLE/INACTIVE mode mobility, one set X which prioritizes selection towards EN-DC capable cells, and one set Y which prioritizes selection towards non-EN-DC capable cells. These different sets of parameters may be associated with different identifiers.

The network/network node 16 such as via one or more of processing circuitry 68, processor 70, radio interface 62, indication unit 32, etc. can, e.g., when the network releases a wireless device 22, indicate to the wireless device 22 whether that wireless device 22 such as via one or more of processing circuitry 84, processor 86, radio interface 82, selection unit 34, etc. may apply the parameter set X or parameter set Y. If the wireless device 22 is an EN-DC capable wireless device 22, the network/network node 16 such as via one or more of processing circuitry 68, processor 70, radio interface 62, indication unit 32, etc. may indicate to this wireless device 22 that the wireless device 22 may apply parameter set Y, while if the wireless device 22 is not EN-DC capable, the network/network node 16 such as via one or more of processing circuitry 68, processor 70, radio interface 62, indication unit 32, etc. may indicate that the wireless device 22 may apply parameter set X.

The wireless device 22 such as via one or more of processing circuitry 84, processor 86, radio interface 82, selection unit 34, etc. may, when it is in IDLE/INACTIVE, use parameters X or parameters Y depending on the network indication.

If the wireless device 22 physically and/or logically moves to another area or cells, the wireless device 22 such as via one or more of processing circuitry 84, processor 86, radio interface 82, selection unit 34, etc. may not be able to find the parameter set it has been indicated to apply. For example, the wireless device 22 was in a city center (i.e., location) where EN-DC was used by the network/network node 16 and the cells in that area may then broadcast both parameters for EN-DC wireless devices 22 and parameters for non-EN-DC wireless devices 22, however the wireless device 22 may physically move out of the city center towards an area where EN-DC is not deployed for the cells in that area. It may be such that those cells are not providing parameters "for EN-DC wireless devices 22". A wireless device 22 which has been indicated to provide EN-DC parameters may then revert to apply the non-EN-DC parameters (note, those may be the only parameters which the network/network node 16 are providing). If the wireless device 22 later enters an area where EN-DC parameters are provided, the wireless devices 22 may start applying those parameters.

Some aspects of this disclosure may be implemented in the RRC protocol of NR, hence some parts of the disclosure may be implemented in a cloud implementation.

Some Examples

Embodiment A1. A network node 16 configured to communicate with a wireless device 22, the network node 16 configured to, and/or comprising a radio interface 62 and/or comprising processing circuitry 68 configured to:

optionally indicate a plurality of sets of parameters for IDLE/INACTIVE mode mobility parameters; and indicate one of the plurality of sets of parameters the wireless device 22 is to implement.

Embodiment A2. The network node 16 of Embodiment A1, wherein the plurality of sets of parameters are indicated based at least in part on at least one of an identifier and a location of the identifier within signaling.

Embodiment A3. The network node 16 of Embodiment A1, wherein the indication of one of the plurality of sets is provided by a parameter set indication.

Embodiment A4. The network node 16 of Embodiment A3, wherein the parameter set indication is determined based at least in part on wireless device capability, release version of the wireless device 22 and mobility state of the wireless device 22.

Embodiment A5. The network node 16 of Embodiment A1, wherein the plurality of sets of parameters includes at least one set for EURAN-NR-Dual-Connectivity (EN-DC) capable wireless devices 22 and at least one set for non-EN-DC capable wireless devices 22.

Embodiment B1. A method implemented in a network node 16 that is configured to communicate with a wireless device 22, the method comprising:

optionally indicating a plurality of sets of parameters for IDLE/INACTIVE mode mobility parameters; and indicating one of the plurality of sets of parameters the wireless device 22 is to implement.

Embodiment B2. The method of Embodiment B1, wherein the plurality of sets of parameters are indicated based at least in part on at least one of an identifier and a location of the identifier within signaling.

Embodiment B3. The method of Embodiment B1, wherein the indication of one of the plurality of sets is provided by a parameter set indication.

Embodiment B4. The method of Embodiment B3, wherein the parameter set indication is determined based at least in part on wireless device capability, release version of the wireless device 22 and mobility state of the wireless device 22.

Embodiment B5. The method of Embodiment B1, wherein the plurality of sets of parameters includes at least one set for EURAN-NR-Dual-Connectivity (EN-DC) capable wireless devices 22 and at least one set for non-EN-DC capable wireless devices 22.

Embodiment C1. A wireless device 22 configured to communicate with a network node 16, the wireless device 22 configured to, and/or comprising a radio interface 82 and/or processing circuitry 84 configured to:

optionally receive an indication for a plurality of sets of parameters for IDLE/INACTIVE mode mobility parameters; and receive an indication for one of the plurality of sets of parameters to implement.

Embodiment C2. The wireless device 22 of Embodiment C1, wherein the plurality of sets of parameters are indicated based at least in part on at least one of an identifier and a location of the identifier within signaling.

Embodiment C3. The wireless device 22 of Embodiment C1, wherein the indication of one of the plurality of sets is provided by a parameter set indication.

Embodiment C4. The wireless device 22 of Embodiment C3, wherein the parameter set indication is based at least in part on wireless device capability, release version of the wireless device 22 and mobility state of the wireless device 22.

Embodiment C5. The wireless device 22 of Embodiment C1, wherein the plurality of sets of parameters includes at least one set for EURAN-NR-Dual-Connectivity (EN-DC) capable wireless devices 22 and at least one set for non-EN-DC capable wireless devices 22.

Embodiment C6. The wireless device 22 of Embodiment C1, wherein the wireless device 22 and/or the radio interface 82 and/or the processing circuitry 84 is further configured to:

if the one of the plurality of sets of parameters to implement is not valid, implement a default one of the plurality of sets of parameters.

Embodiment D1. A method implemented in a wireless device 22 that is configured to communicate with a network node 16, the method comprising:

optionally receiving an indication for a plurality of sets of parameters for IDLE/INACTIVE mode mobility parameters; and receiving an indication for one of the plurality of sets of parameters to implement.

Embodiment D2. The method of Embodiment D1, wherein the plurality of sets of parameters are indicated based at least in part on at least one of an identifier and a location of the identifier within signaling.

Embodiment D3. The method of Embodiment D1, wherein the indication of one of the plurality of sets is provided by a parameter set indication.

Embodiment D4. The method of Embodiment D3, wherein the parameter set indication is based at least in part on wireless device capability, release version of the wireless device 22 and mobility state of the wireless device 22.

Embodiment D5. The method of Embodiment D1, wherein the plurality of sets of parameters includes at least one set for EURAN-NR-Dual-Connectivity (EN-DC) capable wireless devices 22 and at least one set for non-EN-DC capable wireless devices 22.

Embodiment D6. The method of Embodiment D1, further comprising:

if the one of the plurality of sets of parameters to implement is not valid, implementing a default one of the plurality of sets of parameters.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device for communicating with a network node, the wireless device comprising:
   processing circuitry configured to:
      receive an indication of a plurality of sets of parameters for IDLE/INACTIVE mode mobility parameters, the indication of the plurality of sets of parameters being received in a broadcast of system information block, SIB, signaling, a first set of parameters of the plurality of sets of parameters corresponding to a legacy set of parameters and a second set of parameters of the plurality of sets of parameters corresponding to an alternative set of parameters to the legacy set;
      receive an indication of one of the plurality of sets of parameters for the wireless device to implement, the indication of the one of the plurality of sets of parameters for the wireless device to implement being received in radio resource control, RRC, signaling and indicating the first set of parameters or the second set of parameters; and
      discard the indication of the one of the plurality of sets of parameters for the wireless device to implement based on movement of the wireless device out of an area.

2. The wireless device of claim 1, wherein the processing circuitry is configured to discard the indication of the one of the plurality of sets of parameters for the wireless device to implement based on expiration of a timer.

3. The wireless device of claim 2, wherein the processing circuitry is configured to initiate the timer based on receiving the indication of one of the plurality of sets of parameters for the wireless device to implement.

4. The wireless device of claim 1, wherein the processing circuitry is configured to discard the indication of the one of the plurality of sets of parameters for the wireless device to implement based on:
   a determination that the indication of the one of the plurality of sets of parameters for the wireless device to implement is not supported by a cell.

5. The wireless device of claim 1, wherein the RRC signaling is a RRC release message.

6. The wireless device of claim 1, wherein a first set of parameters of the plurality of sets of parameters prioritizes a first frequency for the IDLE/INACTIVE mode; and
   a second set of parameters of the plurality of sets of parameters prioritizes a second frequency for the IDLE/INACTIVE mode.

7. The wireless device of claim 1, wherein the plurality of sets of parameters correspond to a plurality of sets of cell reselection parameters.

8. A method performed by a wireless device that is configured to communicate with a network node, the method comprising:
   receiving an indication of a plurality of sets of parameters for IDLE/INACTIVE mode mobility parameters, the indication of the plurality of sets of parameters being received in a broadcast of system information block, SIB, signaling, a first set of parameters of the plurality of sets of parameters corresponding to a legacy set of parameters and a second set of parameters of the plurality of sets of parameters corresponding to an alternative set of parameters to the legacy set;
   receiving an indication of one of the plurality of sets of parameters for the wireless device to implement, the indication of the one of the plurality of sets of parameters for the wireless device to implement being received in radio resource control, RRC, signaling and indicating the first set of parameters or the second set of parameters; and
   discarding the indication of the one of the plurality of sets of parameters for the wireless device to implement based on movement of the wireless device out of an area.

9. The method of claim 8, further comprising discarding the indication of the one of the plurality of sets of parameters for the wireless device to implement based on expiration of a timer.

10. The method of claim 9, further comprising initiating the timer based on receiving the indication of one of the plurality of sets of parameters for the wireless device to implement.

11. The method of claim 8, further comprising discarding the indication of the one of the plurality of sets of parameters for the wireless device to implement based on:
   a determination that the indication of the one of the plurality of sets of parameters for the wireless device to implement is not supported by a cell.

12. The method of claim 8, wherein the RRC signaling is a RRC release message.

13. The method of claim 8, wherein a first set of parameters of the plurality of sets of parameters prioritizes a first frequency for the IDLE/INACTIVE mode; and
   a second set of parameters of the plurality of sets of parameters prioritizes a second frequency for the IDLE/INACTIVE mode.

14. The method of claim 8, wherein the plurality of sets of parameters correspond to a plurality of sets of cell reselection parameters.

* * * * *